United States Patent
Javan

[11] 3,922,618
[45] Nov. 25, 1975

[54] MULTIPLE TRANSITION LASER
[75] Inventor: Ali Javan, Boston, Mass.
[73] Assignee: Massachusetts Institute of Technology, Cambridge, Mass.
[22] Filed: May 28, 1974
[21] Appl. No.: 473,431

[52] U.S. Cl.......... 331/94.5 M; 331/94.5 G; 330/4.3
[51] Int. Cl............................ H01s 3/22; H01s 3/10
[58] Field of Search..................... 331/94.5; 330/4.3

[56] References Cited
OTHER PUBLICATIONS

Wood, II, Proc. IEEE, 62, Mar. 1974, No. 3, pp. 355-397.
Clobes, 17th Int'l Electron Devices Meeting (Abstr.) Washington D.C. 11-13 Oct. 71 (IEEE) p. 116, 18.
Brookman, Jr. Doctorac Thesis-Mode Locking . . . Kr lasers, Avail. Univ. Microfilms No. 72-17966, 101 pp.

Primary Examiner—Robert J. Webster
Attorney, Agent, or Firm—Arthur A. Smith, Jr.; Martin M. Santa; John N. Williams

[57] ABSTRACT

A laser is forced to oscillate stably and simultaneously upon multiple transitions by modulation of emissions in the laser cavity at a frequency related to the frequency spacing D between the desired transitions. Spread of lasing action to further transitions in the series is achieved by pressure line-broadening and/or additional modulation related to step frequency $d$ by which spacing D may approximately vary through the series. By selection of the modulation frequencies $D_m$ and $d_m$ as integer multiples of the cavity resonance, cavity regeneration is assured at the various transitions leading to simultaneous oscillation at many frequencies. In the embodiment shown, a $CO_2$ molecular laser, the pulses are of subnanosecond duration, less than the cross-relaxation time between the various rotational states of the molecular band. An amplifier receiving the output of such laser oscillator gives up its energy at the various transitions even when pumped with the very short pulse lengths. A $CO_2$ laser oscillator and amplifier chain constructed to operate in the atmospheric and super atmospheric regime is shown, its subnanosecond pulses having extremely high energy, useful in controlled thermonuclear and lidar applications. Also by use of pressure line-broadening to operate the laser upon many frequencies spaced equally apart, but each arising from a different transition, a uniform repetition rate of very short pulses is achievable by interference of the various laser lines.

21 Claims, 13 Drawing Figures

MULTIPLE TRANSITION LASER

The invention herein described was made in the course of work performed under contract with the Department of the Navy and the Air Force Office of Scientific Research.

This invention relates to lasers which enable energy to be obtained efficiently from molecular laser media even in cases where the laser pulse is shorter than the cross-relaxation time between different upper states in the lasing band.

In certain aspects the invention more broadly enables laser oscillators and amplifiers to operate simultaneously, stably upon multiple transitions. The inventions also relates to the use of multiple frequency lasers such as the foregoing in holographic systems.

BACKGROUND OF THE INVENTION

Most molecular laser oscillators and amplifiers, for instance the $CO_2$ laser, have operated at a single transition, with cross-relaxation, through molecular collisions, occurring between adjoining upper energy states in the molecular band causing energy to be transferred to the state at which lasing occurs. In cases where it is desired to maximize power, and especially in the case of short pulses of a nanosecond or less duration, insufficient time is available during the lasing pulse for such cross-relaxation effects to occur. As a result, potential power can be detrimentally left behind at the various amplifier stages. With reference to "Multi-Line Pulsed $CO_2$ Oscillator", S. Tiltch, *Optics Communications*, Vol. 7, No. 4, Page 397, 1973, and "Nanosecond Pulsed Amplification in Electron Beam Pumped $CO_2$ Amplifier", C. F. Figueira, W. H. Reichelt, G. T. Schappert, T. F. Stratton, and C. A. Senstermacher, *Applied Physics Letters*, Vol. 22, Page 216, 1973, an attempt has been made to provide an oscillator which oscillates at more than one transition but the method of obtaining simultaneous oscillations on several transitions has been unreliable. In other instances, as where power at more than one frequency is desired, cross-relaxation effects can be self-defeating.

FEATURES OF THE INVENTION

The invention involves use of a laser medium that is capable of supporting oscillations at different frequencies corresponding to transitions between different upper and lower energy states. In such media, the characteristic frequency spacing $D_{1,2}$ between peak frequencies of the individual gain curves for selected first and second transitions (preferably, but not necessarily, adjacent transitions in a series) is in the microwave range, e.g. 20,000 to 50,000 MHz, of a value dependent upon the nature of the laser medium. The invention features an optical modulator disposed within the laser cavity, and a modulating source which produces modulation at frequency $D_m$ corresponding substantially to $D_{1,2}$. This results in generation of a side band of the frequency of the favored transition, matched to the spacing between the transitions, which forces stable laser oscillations at the second transition as well. (This is to be distinguished from mode locking such as shown in U.S. Pat. No. 3,790,901, in which the laser is caused to oscillate at more than one mode within a single transition, but will not lase simultaneously at different transitions.)

Preferred embodiments of the invention are molecular laser oscillators and amplifiers (i.e., lasers wherein the different energy states are attributable to molecules in different rotational states) in which the pulse duration is shorter than the time of cross-relaxation between upper rotational states. An especially preferred embodiment employs a laser medium which includes carbon dioxide, $D_m$ being about 54,000 MHz.

Preferably, making the action possible with only moderate modulation power, the modulation frequency is an integer multiple n of the cavity resonance, $$D_m = n \frac{2c}{L},$$

where $n$ is the integer, $c$ the speed of light and $L$ is the characteristic mode-determining length of the cavity.

According to another aspect of the invention, the peak of the gain curve of a third transition is spaced from the peak of the second transition a characteristic amount $D_{2,3}$ different from but of generally the same value as the spacing $D_{1,2}$ between the peaks of the first and second transitions, and a means is provided to enable the modulation to force laser oscillations at a third frequency corresponding to the third transition, and in certain preferred instances to spread to even more transitions.

In certain preferred embodiments this comprises a means for establishing the pressure of the laser medium at a sufficiently high value to produce sufficient line-broadening that the modulation frequency $D_m$ generated in conjunction with establishing the joint laser oscillations at the first and second transitions also establishes a side band which lies within the gain curve of the third transition and establishes stable oscillation thereat. For producing very short pulses this line-broadening feature is employed in a molecular laser to establish a series of N lasing transitions separated identically from each other by $D_m$. Through interference, pulse widths $t = 1/ND_m$ are produced, where $D_m$ is a microwave frequency of the order of 10,000 MHz or more, in the case of a $CO_2$ laser, of value greater than 30,000 MHz, and N may be 10 or more. Beats between the N transitions, thus without additional switching produce a steady stream of pulses of repetition rate $D_m$. This represents the application of a known technique in mode locking to the quite different situation involving multiple transitions, with the result of a higher repetition rate of ultra-short pulses.

In other preferred embodiments (either alone or in conjunction with the line-broadening feature described above) the difference between the spacings, $d = D_{1,2} - D_{2,3}$, lies in the microwave range and a modulating source of frequency $d_m$ or one of its subharmonics drives a modulator to produce modulation at frequency $d_m$ corresponding substantially to $d$ (for $CO_2$, $d \cong 740$ Hz). Through generation of a further side band this establishes stable laser oscillations at a third frequency corresponding to the third transition. With appropriate selection of values, higher order side bands of the primary transition are effective to cause lasing to spread to more remote transitions.

According to further preferred features of the invention, a single electro-optic modulator is arranged to be driven at both $D_m$ and $d_m$ modulation frequencies, preferably the modulator comprising an optically active medium whose refractive index or polarizing effect changes in response to the modulation. One such embodiment features the implementation of $d_m$ (either full value or by use of a subharmonic) to modulate the $D_m$ modulating source.

Lasers having various of the features described are preferably combined with a laser amplifier receiving the output of the laser and having an output exhibiting amplification at the various transitions.

According to another preferred embodiment of holographic system employs more than one laser frequency for irradiating the object, the amplitude, and phase information of both of the reflected return signals being employed in producing the holographic information. By this means holographic information can be produced with performance characteristics common to microwave or far infrared illuminating sources, but using much higher frequencies in the illuminating beam. Preferred embodiments employ direct beams of the various frequencies as local oscillators at the detector and also a local oscillator at frequency related to $D_m$. Also the transitions corresponding to the first and second frequencies are separated by other transitions, being selected for their capacity of their differences to carry the desired holographic information.

These and numerous other advantages and features of the invention will be understood from the following description of a preferred embodiment taken in conjunction with the drawings wherein.

Figure 1:
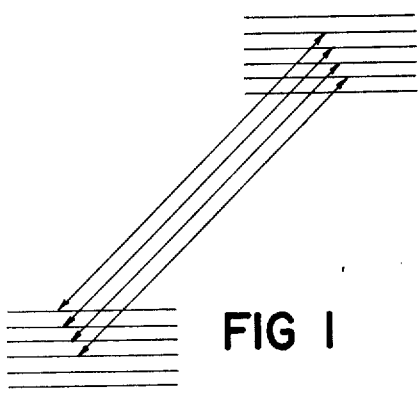
FIG. 1 is a diagram illustrating the $CO_2$ molecular band.
Figure 2:
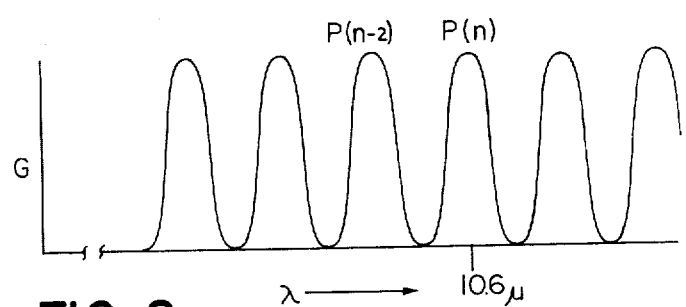
FIG. 2 is a gain curve for the $CO_2$ band plotted against wave length.

The preferred embodiment of the invention employs a $CO_2$ laser. FIG. 1 illustrates various upper and lower rotational states in the 10.6 micron vibrational band while FIG. 2 is a portion of the gain curve over this band. The diagonal lines of FIG. 1 represent the set of substantially independent transitions between different upper and lower rotational states. Further information concerning these states and their frequency spacings are given in Peterson, McDonald, Cupp and Danielson, *Physical Review Letters*, Vol. 31, No. 9, p. 573 (Aug. 27, 1973). The characteristic cross-relaxation time referred to herein for the $CO_2$ molecular laser is the time between which a $CO_2$ molecule can be changed from one of the upper rotational states to another through collisional processes; at one atmosphere pressure it is about 1 nanosecond.

Figure 3:
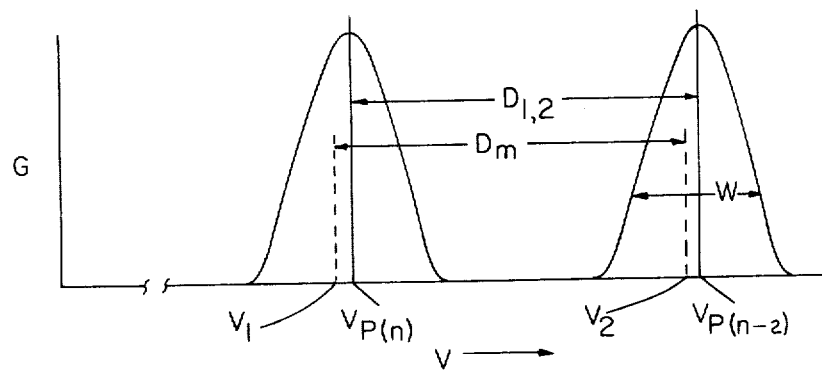
FIG. 3 is a partial gain curve for the $CO_2$ band, on a magnified scale and plotted against frequency.

As it well known, except for those rotational states ruled out at the operating temperature in accordance with known selection rules, lasing in principle can occur at each of the transitions, the relative intensity at these various transitions being illustrated by the gain curve, plotting gain against wave length of FIG. 2, and plotting gain against frequency in the partial, magnified version of FIG. 3.

According to known principles, in the usual laser, if lasing occurs at one transition, it depresses the tendency to lase at the other transitions, so much so that most lasers oscillate at only one transition. Similarly, prior attempts to cause lasing at more than one transition such as described in the articles mentioned above in the description of the background of the invention have the tendency to cause lasing to jump between different transitions, but not to lase stably and efficiently at both simultaneously.

According to the invention stable oscillation in more than one transition is realized by modulating the most favored frequency with a frequency matched to the frequency interval between the most favored transition frequency and another selected transition frequency to produce a side band forcing lasing at the second transition frequency.

Referring to FIG. 3, the selected frequency of the favored transition P(n) is denoted $V_1$, the distance between peaks of the gain curves of this and the second selected transition is $D_{1,2}$ and the $V_1$ frequency is modulated by $D_m$ which corresponds substantially to $D_{1,2}$. The favored frequency $V_1$, as a result of various known conditions, need not occur precisely at the peak of its respective gain curve, and the modulating frequency $D_m$ need not correspond exactly to the peak-to-peak spacing $D_{1,2}$ as both lasing frequencies $V_1$ and $V_2$ may be off peak, though, of course, they must, as shown, fall within a positive, effective portion of the respective gain curves. For a numerical example, if P(n) is assumed to be P(18) of the $CO_2$ laser, and the second selected transition is P(16) then $D_{1,2}$ is 54,000 MHz. If the pressure of the lasing medium is one atmosphere, the line breadth arising from line-broadening due to pressure is about 6,500 MHz and the envelope for $D_m$ ranges between about 48,000 MHz and 60,000 MHz. While it is essential that $D_m$ stay within this envelope, it is possible to generate $D_m$ by generation from one of its subharmonics, and this indeed is preferable in instances where direct sources of $D_m$ frequency are costly, unstable, or of low power because of the high value of the frequency $D_m$. Before proceeding to describe how more than two transitions can be forced, more details of the preferred embodiment will be mentioned.

Figure 4:
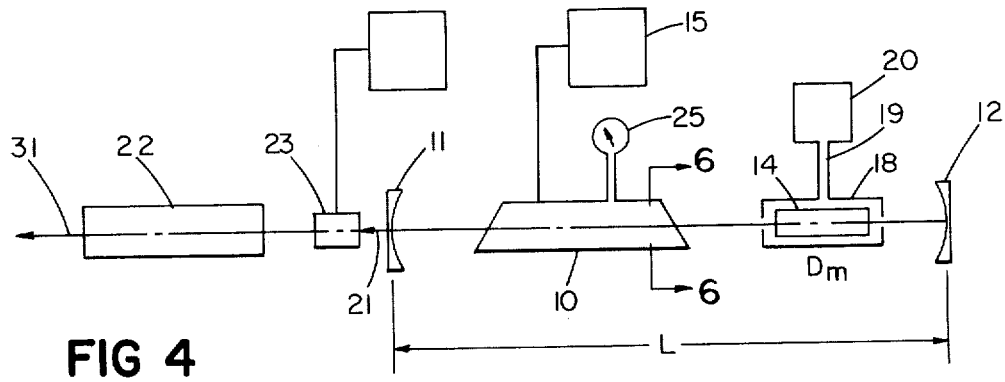
FIG. 4 is a diagrammatic side view of one preferred embodiment of the invention.
Figure 5:
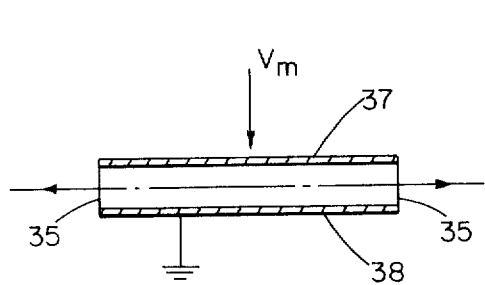
FIG. 5 is a diagrammatic view of a modulator useful in the embodiment of FIG. 4.
Figure 6:
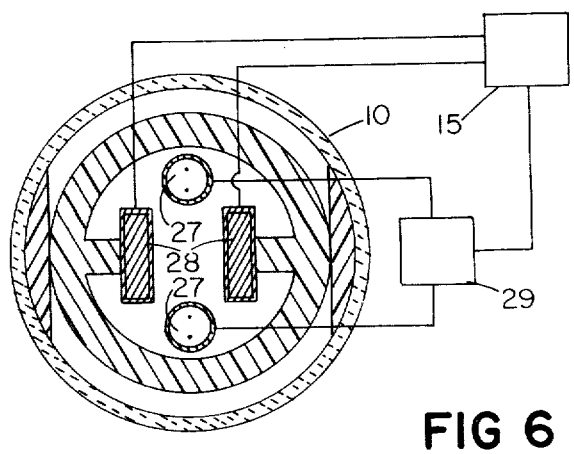
FIG. 6 is a cross-sectional view of the laser medium of FIG. 4 taken on lines 6—6 thereof.

Referring to FIG. 4, active laser medium 10 is disposed in laser cavity of length L, defined by spaced mirrors 11, 12. An optical modulator 14 transparent to the 10.6 micron wave length and optically active for modulation purposes is disposed in the cavity. In one preferred embodiment, referring to FIG. 5, the modulator comprises an electro-optical crystal of gallium arsenide having ends 35 disposed to pass the lasing beam and having opposite sides to which electrodes 37, 38 are plated. The crystal has a refractive index that varies with voltage applied across the electrodes, thus changing the optical delay imparted by the crystal to the lasing beam to effect phase modulation (similarly by polarizing the laser signal, as by use of Brewster angle plates, the capability of the crystal to turn its polarizing effect by an amount dependent upon the voltage across it, effects amplitude modulation of the laser signal). This electrooptical modulator is placed in microwave cavity 18 which is connected through wave guide 19 to a microwave source 20 having means to generate microwave frequency $D_m$, e.g., 54,000 MHz. Source 20, for example, can be a high power pulsed magnetron or a high power klystron.

The various parameters of this embodiment are then established whereby, upon operation, the laser tends to oscillate in the favored $P(n)$ transition, e.g. $P(18)$. With the microwave source 20 operating and the modulator 14 responsive thereto, the laser beam frequency $V_1$ is modulated so that the side band frequency $V_2$ is generated in the laser cavity. Even with very small signal strength, the side band frequency as well as the main frequency participate in stimulated emission, and thus the gain under the curves at both transitions $P(n)$ and $P(n-2)$, see FIG. 2, are employed. The output 21 of this laser is passed into laser amplifier 22, which in response amplifies both. Amplifier output 31 may similarly be amplified, thus to generate a higher energy output at frequencies of the two transitions.

If the microwave source instead generates the first subharmonic of $D_m$, then its second side band would be $V_2$, with effects as above.

To obtain cavity regeneration at the second transition, $V_2$, and to make it possible to operate with moderate levels of modulation, the modulation frequency is maintained as an integer multiple of the cavity resonance, thus $D_m = nC/2L$ where $C$ is the speed of light and $L$ is the characteristic mode-determining length of the laser cavity. In the case of simple cavities, L is the cavity length, while in complex cavities, such as a laser coupled to an etalon or an external interferometer as in a Smith cavity, it is different from the cavity length according to known principles (for $L = 1$ meter, $C/2L = 150$ MHz). In setting up the laser, this relationship may be obtained by tuning the microwave source or in adjusting the length of the laser cavity.

Lasers may be effectively provided with a power source and control 15 which may also act to produce short pulse duration. In the preferred embodiment of FIG. 4, however, the short pulse function is performed by an electro-optical switch 23 which receives the laser output 21 and produces short pulses as desired, even of subnanosecond or shorter duration, containing both $V_1$ and $V_2$ frequencies. Following this the short pulses pass into laser amplifier 22, having a channel spectrum including frequencies $V_1$ and $V_2$. According to the preferred embodiment, a means denoted by pressure control 25 is employed to establish a pressure appropriate to produce the desired line broadening.

For enabling effective lasing at such pressure a means of pre-ionization is employed before each lasing action. For this purpose flash lamps 27 are provided to emit to the cavity between the electrodes 28, with timing of the flash accomplished by control 29.

The photons from the lamps ionize the gas between the electrodes by photo-ionization and the voltage between the electrodes accelerates the thus-freed electrons to the extent that they excite the inverted state in the lasing medium required for lasing action. For further details of this and similar schemes useful herein, reference is made to copending U.S. application Ser. No. 301,894, filed Oct. 30, 1972, now U.S. Pat. No. 3,826,997 and Ser. No. 335,820, filed Feb. 26, 1973, and references therein cited.

Figure 7:
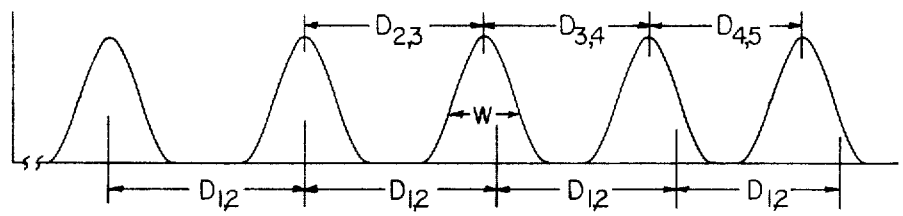
FIG. 7 is a gain diagram of a laser medium employing line-broadening to spread the effects illustrated in FIG. 2.

The apparatus just described is useful for forcing three or more transitions, not being limited to just the pair, $P(n)$ and $P(n-2)$. Referring now to FIG. 7, by operating at a predetermined pressure, a corresponding amount of line-broadening of the gain curves occurs, the line width w spanning the desired range of frequencies. Despite the fact that the spacing $D_{1,2}$ between transitions $P(n)$ and $P(n-2)$ and $D_{2,3}$ between $P(n-2)$ and $P(n-4)$ do not coincide, by maintaining a sufficiently high operating pressure as by control 25, sufficient line-broadening occurs to make the side band $V_3$ generated by the interaction of modulation $D_m$, and a lasing frequency to fall within the gain curve of the next adjacent transition. The effect is the same as above, causing laser oscillations at $V_3$ (or $V_0$). Depending upon the selected level of pressure, this effect may spread through the system to tap a series of 3 or more transitions, the side band of each lasing frequency leading to the next, depending upon the parameters employed.

In another preferred embodiment the laser of FIG. 4 is employed, omitting the switch 23, and depending upon the frequency $D_m$ to establish a corresponding pulse repetition rate. The laser medium is $CO_2$ and pressure control 25 is set to maintain a sufficiently high pressure that the modulating frequency, $D_m = 54,000$ MHz, produces a spreading effect to a number N of 10 or more transitions; in other words, referring to FIG. 7, the series of equal spacings $D_{1,2}$ extends to at least 10 transitions before falling outside the gain envelope of a transition in the series.

So constructed the pulse width
$t = 1/ND_m = 1/10 \times 54,000 \text{ MHz} = 2 \times 10^{-12}$,
a pulse duration in the picosecond range.

Figure 8:
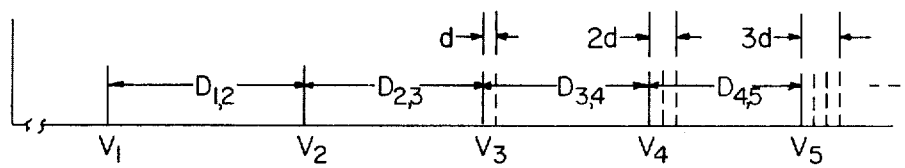
FIG. 8 is a diagram illustrating differences in peakto-peak spacings for the gain of a succession of transitions.

The spread of this action through the band is not limited to the use of line-broadening techniques. According to another aspect of the invention, further modulation is employed as an alternative or in conjunction with line-broadening. In this respect it is realized that in certain laser media, especially in molecular lasers, there is sufficient regularity with which the spacings D between transitions vary to be useful by introduction of a further modulation corresponding to a step value. While not precise, the variations roughly vary by multiples of a constant step $d$, i.e.:
$D_{1,2} = D_{1,2}$
$D_{2,3} \cong D_{1,2} - d$
$D_{3,4} \cong D_{1,2} - 2d$ This relationship is illustrated in FIG. 8, and can be expressed generally $V_{n+1} \cong V_n + D - (n-2)d$ over a number of transitions at low pressure, the number being capable of increase by use also of a selected amount of line-broadening by increase of pressure.

Figure 9:
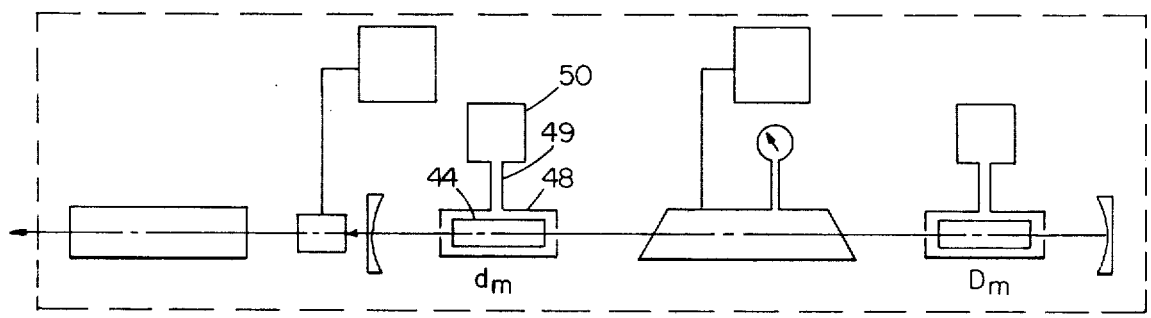
FIG. 9 is a view similar to FIG. 4 of another preferred embodiment of the invention.

Referring to FIG. 9, a second modulator 44 in the $CO_2$ laser cavity, within a microwave cavity 48, is connected by wave guide 49 to microwave source 50, adapted to drive modulator 44 at modulation frequency $d_m$, corresponding substantially to the step value d of 740 MHz and constituting an integer multiple $n_1$ of the cavity resonance, i.e.:
$d_m = n_1 C/2L$
Source 50 similar to source 20 may generate a subharmonic of $d_m$ instead of $d_m$ per se.

With this embodiment the main lasing frequency $V_1$ and the modulation frequencies $D_m$ and $d_m$ effectively mix whereby side bands fall within the given curves of a number of the transitions with resultant lasing at these transitions. In the case of $d_m$:

it interacts directly with $V_2$ and $D_m$ to generate $V_3$;
the first side band of $d_m$ interacts with $V_3$ and $D_m$ to generate $V_4$;
the second side band of $d_m$ interacts with $V_4$ and $D_m$ to generate $V_5$, et seq.

Figure 9A:
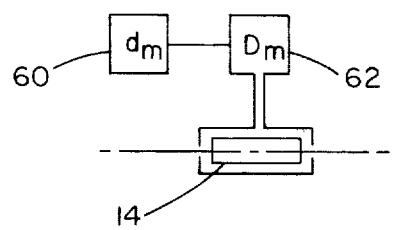
FIG. 9a is a representation of a microwave generator which itself is modulated by another to accomplish spread of lasing to a number of transitions.

Referring to the alternative of FIG. 9a, a $d_m$ frequency source 60 is employed to turn on and off microwave generator 62, thus exposing modulator 14 to both frequencies.

Figure 10:
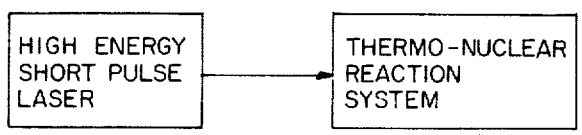
FIG. 10 is a diagram of a controlled thermonuclear reaction system.

Referring to FIG. 10, the system 40 of FIG. 9 is employed in combination with a controlled thermonuclear reactor where use is made of the extremely high energy contained in subnanosecond pulses.

Figure 11:
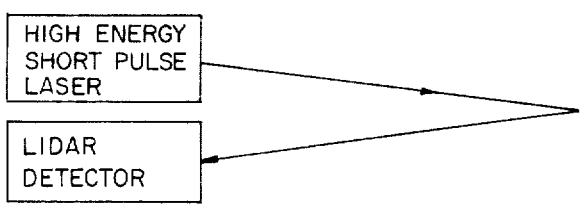
FIG. 11 is a diagram of a lidar system employing the invention.

In FIG. 11 system 40 is employed in combination with a lidar system for ranging or visibility measurements by return signal reflected from distant objects or suspended particles. In either instance, the shortness of the pulse ensures good resolution while the transition forcing effect ensures sufficient power of the returned signal.

In, for instance, the $N_2O$ molecular laser, $D = 24,000$ MHz between adjacent transitions and $d = 100$ MHz.

In other embodiments other lasers, including atomic lasers (e.g. the few iodine lines can be simultaneously forced) and chemical lasers may be employed, and the optical modulator chosen for transmissive qualities of the particular frequencies involved. Accoustically driven gaseous or solid optical modulators, and modulators based upon varying polarization are useful according to well-known techniques such as are used in known mode locking techniques.

Figure 12:
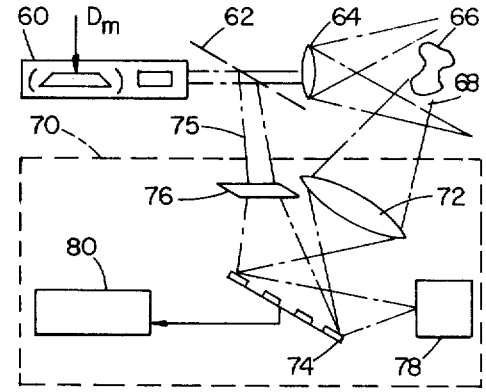
FIG. 12 is a diagram of a holographic system according to the invention.

Referring to FIG. 12, a holographic system employs two illuminating frequencies and uses the difference values for carrying the holographic information. For instance the illuminating frequencies may be in the region of the near infrared, with the various advantages attendant thereto, e.g. small size of transmitting and receiving equipment. The difficulties that arise when processing such frequencies directly, such as the effects of phase jitter, are avoided by use of the difference frequency and not the illuminating frequency alone.

The difference frequency may be selected in the far infrared, submillimeter or microwave range depending upon the application, and after detection the processing of the information, i.e. the production of the Fourier Transforms of the information, can proceed as if the illuminating radiation had been of such lower frequency.

Referring to FIG. 12, according to the preferred embodiment of this aspect of the invention, a laser system 60 such as shown in FIG. 4 or FIG. 9 is employed as the illuminating source, the beam passing through half-silvered mirror 62, thence through lens or telescope 64 to object 66. the return signal 68 reaches detector 70 where it is focused by lens or telescope 72 upon a radiation-sensitive planar surface 74 of the detector. This surface may comprise an array of printed metal-dielectric-metal diodes responsive to the radiation, as described in my copending patent application Ser. No. 389,783, filed Aug. 20, 1973 which is hereby incorporated by reference. A beam 74 from laser 60 is passed directly to the detector 70 by mirror 62, and in detector 70 is focused by lens 76 upon the responsive surface 74. Also radiation source 78 at frequency related to $D_m$ also illuminates the responsive surface. According to well known heterodyning techniques such as mentioned in the above-cited application, I. F. signals are produced at the various discrete positions in the responsive surface, and these are directed as indicated diagrammatically in FIG. 12 to processor 80 which produces the holographic information in the desired form.

What is claimed is:

1. A laser comprising an active laser medium disposed within a resonant cavity, the laser medium capable of supporting laser oscillations at different frequencies corresponding to transitions between different upper and different lower energy states, the peak frequencies of the gain curves for selected first and second transitions being spaced apart a predetermined characteristic amount $D_{1,2}$, in the microwave range, of value dependent upon the nature of the laser medium, an optical modulator disposed within said laser cavity and a modulating source for driving said modulator to modulate radiation in said cavity at frequency $D_m$ corresponding substantially to $D_{1,2}$ to establish through generation of a side band, stable laser oscillations at first and second frequencies corresponding to the gain curves of said first and second transitions.

2. The laser of claim 1 wherein said different energy states are due to molecules in different rotational states.

3. The laser of claim 1 wherein said laser medium includes carbon dioxide, $D_m$ being about 54,000 MHz.

4. The laser of claim 1 wherein said cavity has a characteristic resonance $c/2L$ where c is the speed of light and L is the characteristic mode determining length of the laser cavity, and said modulation frequency is an integer multiple n of said cavity resonance, $$D_m = n \frac{2c}{L}.$$

5. The laser of claim 1 wherein the peak of the gain curve of a third transition of said laser medium is spaced from the peak of said second transition a predetermined characteristic amount $D_{2,3}$, different from but of generally the same value as the spacing $D_{1,2}$ between the peaks of said first and second transitions, and means employing said modulation for establishing laser oscillation at a third frequency corresponding to the gain curve of said third transition.

6. The laser of claim 5 including means for maintaining the pressure of said laser medium at a selected value to produce line-broadening sufficient that a side band, generated in conjunction with establishing said laser oscillations at said first and second transitions, lies within the gain curve of said third transition and establishes stable oscillations thereat.

7. The laser of claim 5 wherein the difference, d, between said spacings, $d = D_{1,2} - D_{2,3}$, lies in the range comprising the microwave and radio frequency ranges, and a modulating source driving a modulator to modulate radiation in said cavity at frequency $d_m$ corresponding substantially to d to establish, through generation of a side band, stable laser oscillations at a third frequency corresponding to the gain curve of said third transition.

8. The laser of claim 7 wherein said laser medium includes carbon dioxide, $d_m$ being about 740 MHz.

9. The laser of claim 7 wherein $d_m = n_1 c/2L$ where c is the speed of light, L is the characteristic mode determining length of the laser cavity, and $n_1$ is an integer.

10. The laser of claim 7 wherein a single electro-optic modulator is arranged to be driven at both said $D_m$ and $d_m$ modulation frequencies.

11. The laser of claim 10 wherein said modulator comprises an optically active medium whose refractive index changes in response to said modulating sources.

12. The laser of claim 10 wherein said $d_m$ modulating source modulates said $D_m$ modulating source.

13. The laser of claim 7 wherein side bands generated through interaction of said modulations at frequencies $D_m$ and $d_m$ correspond to and produce stable oscillations at a more remote frequency corresponding to the gain curve of a further transition.

14. The laser of claim 7 including means for maintaining the pressure of said laser medium at a selected value to produce line-broadening sufficient that a side band, generated in conjunction with establishing said laser oscillations at said first, second, and third frequencies, lies within the gain curve of a more remote transition and establishes oscillations thereat.

15. The laser of claim 1 wherein said different energy states are due to molecules in different rotational states, said laser constructed to emit pulses of duration shorter than the time of cross-relaxation between said energy states.

16. The laser of claim 1 in combination with a laser amplifier receiving the output of said laser and having an output exhibiting amplification of both said first and second frequencies.

17. The laser of claim 1 wherein said different energy states are due to molecules in different rotational states, said laser constructed to emit pulses of duration shorter than the time of cross-relaxation between said energy states in combination with a laser amplifier receiving the output of said laser and having an output exhibiting amplification of both said first and second frequencies.

18. The laser of claim 1 in the form of a $CO_2$ laser with the laser medium at least at atmospheric pressure.

19. A laser construction capable of emitting ultra-short pulses comprising an active laser medium disposed within a resonant cavity, the laser medium capable of supporting laser oscillations at a series of different frequencies corresponding to transitions between different upper and different lower energy states attributable to molecules in different rotational states, adjacent transitions in said series being spaced apart by microwave frequencies D of the order of 10,000 MHz or more, means for maintaining the pressure of said laser medium at a selected value to produce line-broadening such that each of the gain curves of said transitions such that each of a series of N frequencies spaced successively apart by a given microwave frequency $D_m$ of value of the order of D falls within the gain curve of a corresponding different transition, an optical modulator disposed within said laser cavity and a modulating source driving said modulator to modulate radiation in said cavity at said frequency $D_m$ to establish through generation of side bands radiation at N different transitions, constructive interference between the resulting radiation at said N transitions producing a series of pulses of pulse width $t = 1/ND_m$.

20. The laser construction of claim 19 wherein said laser medium is $CO_2$, $D_m$ being greater than 30,000 MHz, and N being about 10 or more.

21. The laser construction of claim 19 wherein the repetition rate of pulses emitted from said laser is steady at a frequency $D_m$ controlled by said modulation.

* * * * *